Feb. 10, 1959 P. J. NILSEN 2,873,415
PHASE-SHIFTING CAPACITOR
Filed Aug. 30, 1956

Inventor
PETER J. NILSEN
by: Carlson, Pitzner, Hubbard & Wolfe
Attys.

United States Patent Office 2,873,415
Patented Feb. 10, 1959

2,873,415

PHASE-SHIFTING CAPACITOR

Peter J. Nilsen, Lombard, Ill., assignor to Nilsen Mfg. Co., Addison, Ill., a corporation of Illinois Application August 30, 1956, Serial No. 607,211

3 Claims. (Cl. 317—253)

The present invention relates to phase-shifting capacitors for use in converting from physical to electrical measurement of angular phasing, i. e., from the position of an input shaft to the phasing of a voltage vector in an electrical output circuit.

In "Components Handbook" edited by John F. Blackburn, Massachusetts Institute of Technology, and published by McGraw-Hill Book Company, Inc., New York, New York, printed in 1949 (volume 17, Radiation Laboratory Series), beginning at page 288, a "Nilsen" phase-shifting capacitor is shown and described. Such a capacitor consists of a set of sector-shaped plates, for example, three in number, arranged opposite an annular stator plate. Mounted for rotation between the plates on a coaxial shaft is a cardioid rotor of high dielectric material. With voltages equally spaced in phase applied to the sector-shaped plates, the output voltage vector existing at the annular stator plate has a phasing which corresponds to the angular position of the rotor shaft.

Such capacitors are primarily intended for the accurate measurement of time intervals in radar systems. Briefly stated, the technique used consists of allowing the transmitted pulse to initiate a train of oscillations of known frequency, or of allowing a continuous train of sinusoidal oscillations to initiate the transmitted pulse at the desired instants. The zero-voltage points of either set of these oscillations then constitute a series of accurate time marks. The time measurements can be made continuous by shifting the phase of the oscillations and causing a marker pip to follow a particular zero-voltage point. If the oscillation is shifted in phase by 360°, the resulting wave is indistinguishable from the unshifted wave, but the marker will have moved in time an amount corresponding to one cycle of the oscillation. A further shift causes the marker to move a proportional amount farther. The phase shift necessary to make the marker coincide with an echo of the transmitted pulse is then a measure of the time delay of the echo and thus of the distance to the echo-producing object. Details of the circuits and techniques useful for this form of time measurement will be found in vol. 20, chaps. 8 and 9 of the Radiation Laboratory Series.

Using a rotor of cardioid shape, it is possible to achieve a high degree of accuracy, both as to magnitude and as to phasing in the electrical output of the capacitor. However, the shape of the rotor must correspond precisely to a predetermined, non-circular curve (see page 295 "Components Handbook" identified above) which is difficult to duplicate by conventional manufacturing methods and which, therefore, greatly increases the manufacturing cost of capactiors of this type. Where a circular, eccentrically mounted rotor, produced by simple machining operations, is substituted for the cardioid rotor an error is introduced which is on the order of 0.7°, a magnitude which is objectionable in highly accurate systems (see page 293, "Components Handbook").

Accordingly, it is an object of the present invention to provide a phase-shifting capacitor construction which permits use of an eccentrically mounted rotor of circular formation but which, nevertheless, is capable of achieving high accuracy, i. e., close conformity between the input and output data. It is more specifically an object of the present invention to provide a phase-shifting capacitor using a circular rotor, but in which high accuracy of the output signal is obtained by machining a plurality of straight chord-like cuts at the periphery of the sector plates, which cuts may be made with a high degree of reproducible accuracy in a simple setup using only conventional machining apparatus. Finally, it is an object of the present invention to provide a highly accurate phase-shifting capacitor which may be manufactured at a cost which is substantially less than that of capacitors of the more conventional design.

Other objects and advantages of the invention will become apparent as the discussion proceeds, taken in connection with the attached drawing in which.

Figure 1:
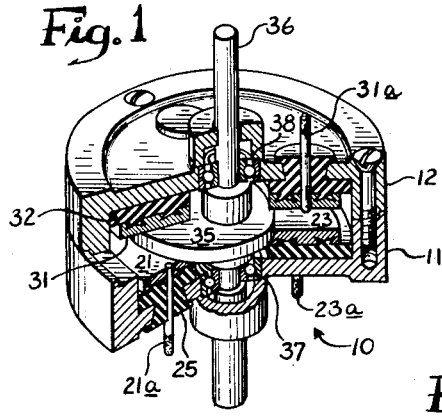
Figure 1 is a perspective cut-away view of a phase-shifting capacitor of the type to which the present invention is applicable.
Figure 2:
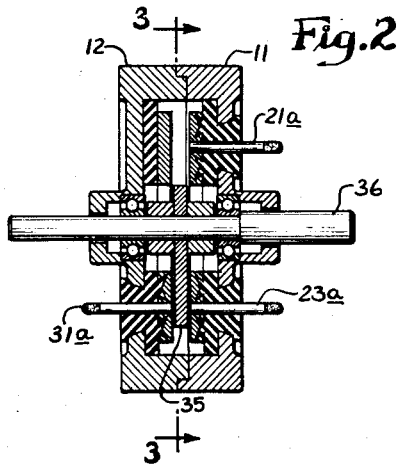
Fig. 2 is a transverse section taken through the capacitor shown in Fig. 1.

While the invention has been described herein in connection with a preferred embodiment it will be understood that the invention is not necessarily limited to such embodiment but includes such equivalents and alternative constructions as may be included within the spirit and scope of the claims appended hereto.

Except for the shape of the sector plates and use of a circular rotor, the construction of the capacitor corresponds to that which is set forth in some detail in the reference work referred to above. The present construction may, however, be summarized briefly as follows:

The capacitor 10 has a cylindrical body comprising a first cup-shaped receptacle 11 and a second cup-shaped receptacle 12 arranged face to face therewith to provide a central annular space. Mounted securely on the inner surface of the receptacle 11 is an annular stator plate having four sector-shaped sections 21–24 inclusive, the sections being insulated from the receptacle 11 by means of plastic insulating material 25. Contact elements 21a–24a extend through the wall of the receptacle for connection to the associated electrical supply circuit. Arranged exactly parallel to the sector plates 21–24 is an annular stator plate 31, the latter being mounted on plastic insulating material 32 and having an output terminal 31a.

Figure 3:
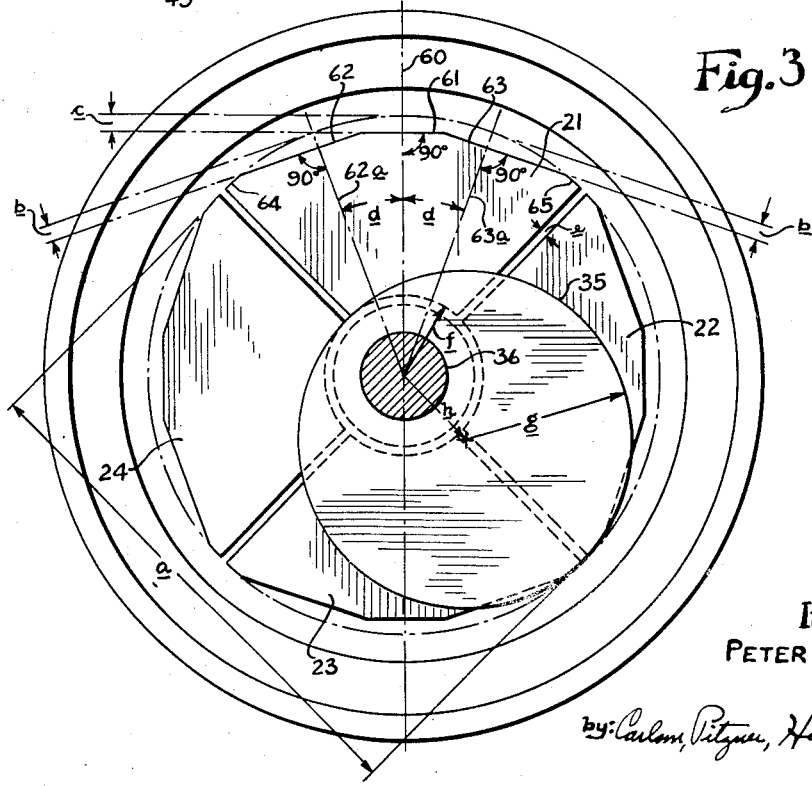
Fig. 3 shows the shape and arrangement of sector plates in a capacitor constructed in accordance with the present invention, being taken along line 3—3 in Fig. 2.

Arranged between the sector plates 21–24 and the stator plate 31 is a rotor 35, consisting of insulating material having a high dielectric constant, mounted on a shaft 36 rotatable in bearings 37, 38. In practicing the present invention the rotor 35 is of circular shape, preferably made of bonded glass and mica, having a low dielectric loss and a dielectric constant of about 7.5. Such material is manufactured under the trademarks Micalex and Mykroy. The dielectric constant is not critical and may be between 5 and 15. The rotor is machined to circular shape by a conventional grinding operation. The rotor 35 is eccentrically mounted on shaft 36 such that its geometrical center is displaced from the axis of shaft rotation by a distance $h$ (Fig. 3). The axis of the shaft is located at the geometrical center of the annular stator plate 31 and the composite annulus formed by the four sector-shaped sections 21–24, so that the rotor will sweep a circular area equal in diameter to the nominal, full diameter $a$ (Fig. 3) of the annulus formed by the four sector plates 21–24.

Figure 4:
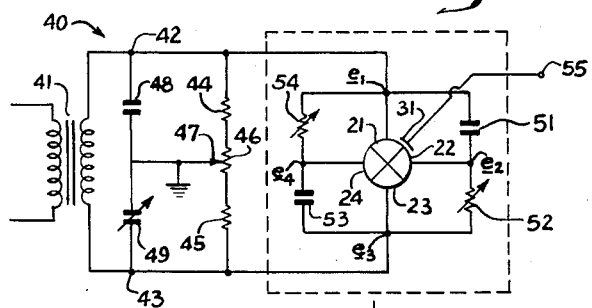
Fig. 4 is a schematic circuit diagram for a source of quadrature voltages to be applied to the sector plates shown in Fig. 3.

Prior to further discussion of the physical structure it will be helpful to have in mind the electrical circuit used for supplying quadrature voltages to the sector shaped electrodes, reference being made to Fig. 4. The circuit shown at 40 has an input transformer 41 connected to the supply line and producing an A.-C. sinusoidal voltage across output terminals 42 and 43. The transformer secondary is electrically center tapped by providing a so called "Wagner" ground consisting of series resistors 44, 45 and a potentiometer 46, the latter having an adjustable grounded wiper arm 47. Adjustment of the potentiometer 46 produces output voltages $e_1$ and $e_3$ which are of equal magnitude but opposite polarity with respect to ground. In order to insure that the two output voltages are precisely opposite in phase, a capacitor network is provided which consists of a fixed capacitor 48 and an adjustable capacitor 49, the impedance of which is preferably high as compared to the resistance in parallel therewith. Quadrature voltages $e_2$ and $e_4$ for the sector plates 22, 24 are obtained by a first network consisting of a capacitor 51 and a resistor 52 and a second network consisting of a capacitor 53 and a resistor 54 connected between the terminals 42, 43 as shown.

Since the voltages supplied to the sector plates are in exact quadrature and of equal magnitude, the voltage appearing at the output terminal 55, absent the rotor 35, will be zero. However, interposition of the rotor 35, because of its high dielectric constant, causes the output terminal to be coupled to, and to have the phasing of, any one of the sector plates 21–24, and it is one of the features of the device that progressive variation occurs in the phasing of the output voltage throughout the entire range from zero to 360 electrical degrees upon corresponding rotation of the rotor shaft.

In accordance with the present invention it has been found that the accuracy of correspondence between the electrical phasing at the output terminal 31a and the mechanical phasing of the rotor may be substantially improved, when using a circular rotor, by removing material from the periphery of the four sector-shaped plates along three chord-wise cuts or "flats" which are symmetrically arranged relative to the center line. Taking the sector-shaped plate 21 by way of example, it will be noted that it has a center line or axis of symmetry 60. The first cut indicated at 61 is taken perpendicular to the center line as shown. Two additional chord-wise cuts are taken, one on each side of the cut 61 and symmetrically arranged with respect to the center line. These cuts are indicated at 62 and 63 respectively, the locus of the cuts 62, 63 intersecting the locus of the first cut 61. Preferably, the cuts 62, 63 are slightly shallower in depth than the central cut and do not extend to the corners of the sector-shaped plate 21 but leave uncut portions at full radius which have been indicated in the drawing at 64, 65 respectively. As clearly shown in Fig. 3 the original full radius of the plate 21 lies on a circle described by the outermost edge portion of the rotor 35, so that after the cuts 61–63 are made they are located within the circular area swept by the rotor as it is turned (see dashed lines at lower, right portion of rotor 35, Fig. 3).

In accordance with a more detailed aspect of the invention it has been found that the angular relationship between the adjacent flats should lie within a range having a critical effect on the accuracy which is achieved, the perpendicular radii constructed to the flats 62, 63 being spaced at equal angles within the range of 18–23 degrees with respect to the line of symmetry 60. In the preferred embodiment illustrated in Fig. 3, the angles between the perpendicular radii of the adjacent flats are both 20.5 degrees. It can be demonstrated that the benefit derived by practicing the present teachings drops off rather rapidly upon departing from the range of 18–23 degrees.

While adherence to the above angular relationship is considered to be the prime reason for the accuracy which has been achieved, it is also true that the depth of cut has a certain effect upon such accuracy. Observations show that the depth of all three of the cuts should be on the order of four to seven percent of the nominal radius of the sector plate and that the side cuts should be slightly shallower than the central cut. Nor is the inner radius $f$ of the sector plates 21–24 critical although it is desirable for the rotor 35, at the point of minimum distance from shaft to rotor periphery, at least to span the distance $f$ to the inner edges of the sector plates. For the further guidance of one practicing the present invention, the following dimensions are exemplary, the lettering corresponding to that set forth in Fig. 3 of the drawing:

| | | |
|---|---|---|
| $a$ | inches | 2.000 |
| $b$ | do | 0.054 |
| $c$ | do | 0.059 |
| $d$ | degrees | 20.50 |
| $e$ | do | 0.031 |
| $f$ | inches | 0.300 |
| $g$ | do | 0.650 |
| $h$ | do | 0.350 |

The diameter of the annular stator plate 31 in the present embodiment is 2.000". The rotor thickness is 0.125" using a material having a dielectric constant of 7.5 and an air gap of 0.008" is preserved on each side of the rotor. Because the distance $g+h=1.00"$ and the full, original radius of the sector plates 1.00", the rotor will extend beyond the center points of the central flats 61 by the distance $c$ (.059") and beyond the center points of the side flats 62, 63 by the distance $b$ (.054") as that edge portion of the rotor farthest removed from the shaft 36 passes such points. That is, the flats 61–63 all lie within the "sweep" of the rotor.

Attempts have been made to verify the suitability of the disclosed angular relationship between the flats by mathematical analysis, employing the efforts of a skilled mathematician. Such mathematical analysis resulted in unmanageable complication. The results, however, tended to indicate that "flats" should be avoided and that the contour of each of the sector plates should be of complex clover leaf design quite different from the present plate contour. Employing the angles specified above, and particularly where the percentage depth of the cut is adhered to, it has been found that a degree of accuracy may be achieved which is equal to the inherent accuracy of accepted commercial phase-measuring devices. Use of a phase shifting capacitor of the present design has enabled a substantial increase in the timing accuracy of radar equipment.

From a practical point of view the procedure outlined herein has brought about a substantial economy in manufacture. It is no longer necessary for the rotor to be of special cardioid shape requiring special time-consuming fabrication, but the rotor may be made perfectly circular enabling rapid manufacture on conventional machines, with a high degree of uniformity from piece to piece. Moreover, the flats 61–63 may be formed with straight-line cutting equipment of conventional design, using a single setup with the receptacle 11 arranged for indexing from one angular position to the next about its central axis, all of the cutting being done after the stator plate is anchored in place within the receptacle 11.

I claim as my invention:

1. In a phase shifting capacitor for use in a continuous phase shifter having a source of quadrature voltages, the combination comprising a first annular stator plate, a second annular stator plate having four sector-shaped sections mounted parallel to the first plate and provision for connection to the quadrature voltages respectively, a rotor in the form of a circular disc of high dielectric material eccentrically mounted for rotation between the plates to pass through a circular sweep area, each of said sector-shaped sections being of symmetrical shape having three flatted portions arranged chordwise on the periphery thereof, the perpendicular radii of said flatted portions being spaced at equal angles in the range 18–23°, and the flatted portions lying wholly within the sweep area of the rotor.

2. In a phase shifting capacitor for use in a continuous phase shifter having a source of quadrature voltages, the combination comprising a first annular stator plate, a second annular stator plate having four sector-shaped sections mounted parallel to the first plate and having provision for connection to the quadrature voltages respectively, a rotor in the form of a circular disc of high dielectric material eccentrically mounted for rotation between the plates to pass through a circular sweep area equal in diameter to the nominal, full diameter of the second annular stator plate, each of said sector-shaped sections being of symmetrical shape having three flatted portions on the periphery thereof, said three flatted portions on each of said sector-shaped sections being located such that radii perpendicular thereto are mutually disposed at angles in the range of 18° to 23°, and said flatted portions also being formed such that the radii to the midpoints thereof are in the range of 4% to 7% shorter than the nominal radius of said sector-shaped sections, and such that the flatted portions lie wholly within the sweep area of the rotor.

3. In a phase shifting capacitor for use in a continuous phase shifter having a source of quadrature voltages, the combination comprising a first annular stator plate, a second annular stator plate having four sector-shaped sections mounted parallel to the first plate and having provision for connection to the quadrature voltages respectively, said second plate having a nominal radius, a rotor in the form of a circular disc of high dielectric material eccentrically mounted for rotation between the plates, said rotor being sized and mounted to sweep through a circular area of a radius equal to said nominal radius, each of said sector-shaped sections having a central flat extending chordwise on the periphery, and two flats arranged symmetrically on the respective sides of the central flat and intersecting the locus of the latter, said flats having depths falling within the range of 4 to 7 percent of the nominal radius of the sector plates, and said flats lying wholly within said sweep area.

References Cited in the file of this patent

UNITED STATES PATENTS

| 2,147,728 | Wintringham | Feb. 21, 1939 |
| 2,461,832 | Meacham | Feb. 15, 1949 |

FOREIGN PATENTS

| 579,251 | Britain | July 29, 1946 |